(No Model.)
J. R. THOMAS.
ADJUSTABLE BEARING FOR UPPER FEED ROLLS OF PLANING MACHINES.
No. 520,714. Patented May 29, 1894.
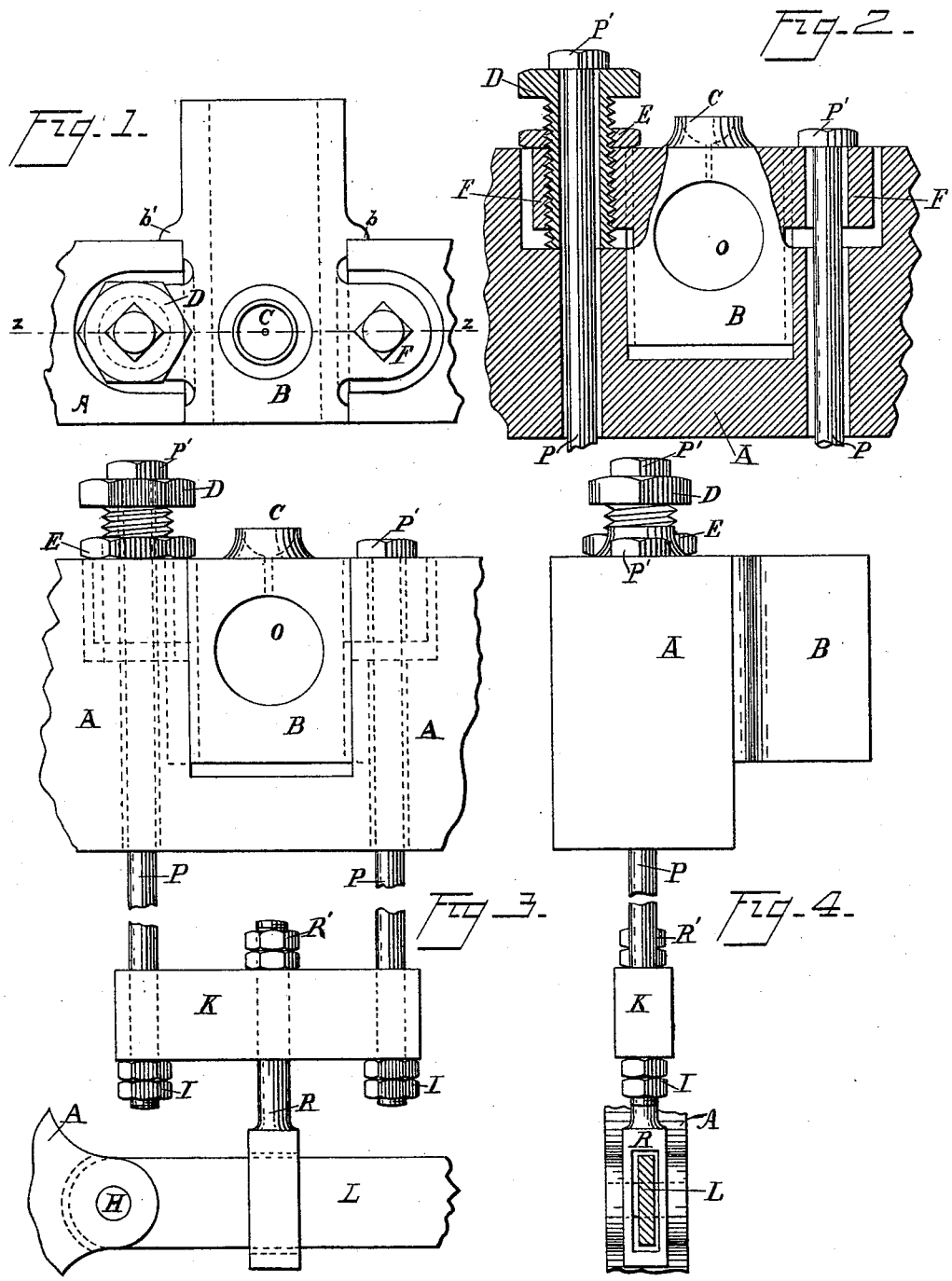

UNITED STATES PATENT OFFICE.

JOHN R. THOMAS, OF BELOIT, WISCONSIN, ASSIGNOR TO THE BERLIN MACHINE WORKS, OF SAME PLACE.

ADJUSTABLE BEARING FOR UPPER FEED-ROLLS OF PLANING-MACHINES.

SPECIFICATION forming part of Letters Patent No. 520,714, dated May 29, 1894.

Application filed February 1, 1894. Serial No. 498,745. (No model.)

*To all whom it may concern:*

Be it known that I, JOHN R. THOMAS, of Beloit, in the county of Rock and State of Wisconsin, have invented a new and useful Improvement in Adjustable Bearings for Upper Feed-Rolls of Planing-Machines, of which the following is a specification.

My invention consists in an improvement in adjustable bearings for the upper feed rolls of planing or other wood-working machines, hereinafter fully described and claimed.

Figure 1 is a top plan view of a portion of the frame and one of the adjustable bearings. Fig. 2 is a section on line z—z, Fig. 1. Fig. 3 is a side elevation showing a portion of the frame bearing and weighted lever, and Fig. 4 is an elevation at right angles with Fig. 3, with the weighted lever in section.

A represents a portion of the frame of a wood-working machine, and B represents an adjustable bearing for a journal of one of the feed rolls, O representing the opening in the bearing to receive said journal. These bearings B slide up and down freely in recesses in frame A, and are held against lateral movement by means of projections b b'. On each side of the bearings B are formed lugs F, lying in recesses in frame A, through one of which is tapped a hole for the reception of a hollow adjusting bolt D. Fitted on top of said lug F, is a check nut E, to prevent any possible displacement of bolt D, after it has been set. Through the hollow bolt D and the other lug F on the opposite side of the bearing, rods P are passed, having on one end heads P', their other ends going through an equalizing block K, and threaded for the reception of locking and adjusting nuts I. Through a hole in the middle of the equalizing block passes a round shank of the looped connecting link R. The shank is threaded on its end to receive the nuts R'. Through the loop at the lower end of the link R passes, freely, the weighted lever L, on the free end of which is an adjustable weight, (not shown,) by which the pressure of the feeding rollers is adapted to the strain required to feed stock through the machine. Bar L is pivoted at H to frame A. C represents an oil cup.

What I claim as my invention, and desire to secure by Letters Patent, is—

1. In a bearing for feed rolls, the combination with the adjustable bearing-block B having lugs F F, of the hollow adjusting bolt D inserted in one of said lugs and provided with check-nut E, headed bolts P P passed through said bolt and through one of said lugs, and a weight suspended from said rods, substantially as described.

2. In a wood planing machine, in combination with the sliding bearing of an upper feed roll, a hollow bolt entering the same and adjustable therein, and a weight suspended by a headed rod which passes through said bolt, substantially as set forth.

3. In combination with the adjustable bearing B of the feed roll, lugs F F, hollow adjusting bolt D, rods P, equalizer K, link R and weighted lever L, substantially as set forth.

4. In combination with adjustable bearing B of the feed rolls, lug F, a hollow bolt D tapped into said lug, rods P P, having a weight attached thereto, substantially as set forth.

JOHN R. THOMAS.

Witnesses:
   THOS. C. HENDLEY,
   EDGAR A. HOWELL.